Sept. 2, 1924.
C. F. ZIMMERMANN
1,507,015
MEANS FOR CONVEYING STEAM AND OTHER FLUIDS UNDER PRESSURE
Filed Feb. 13, 1919
2 Sheets-Sheet 2
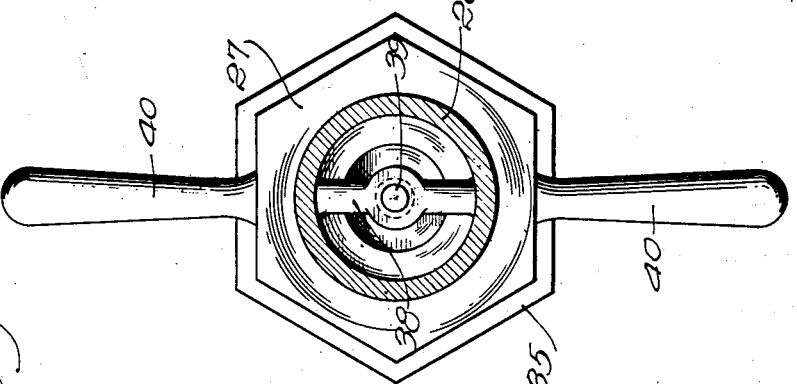
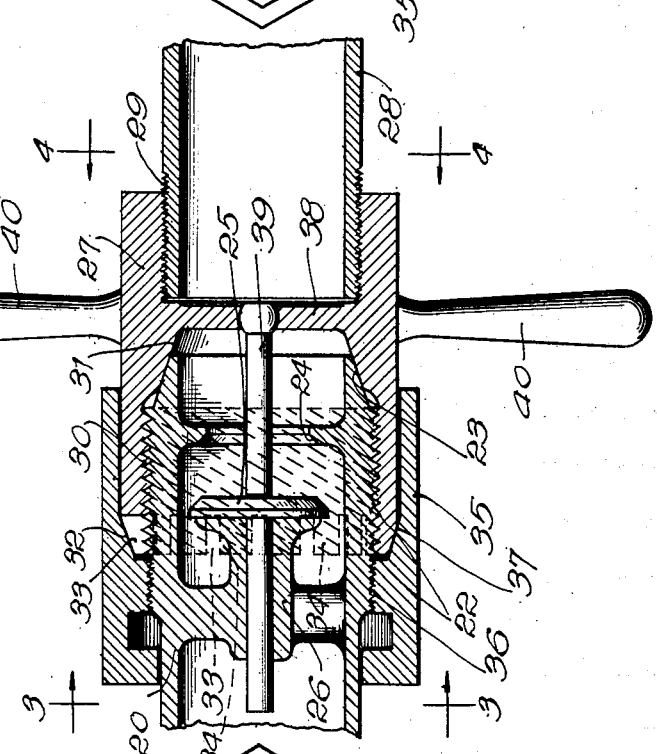
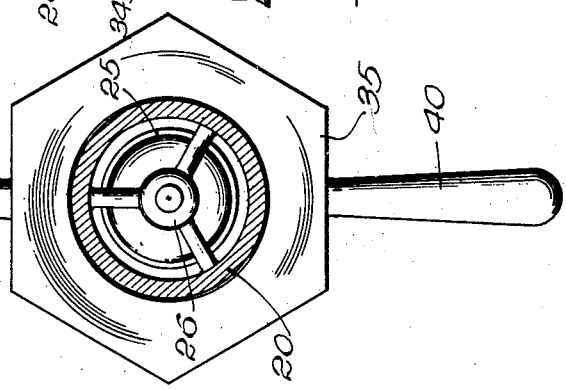

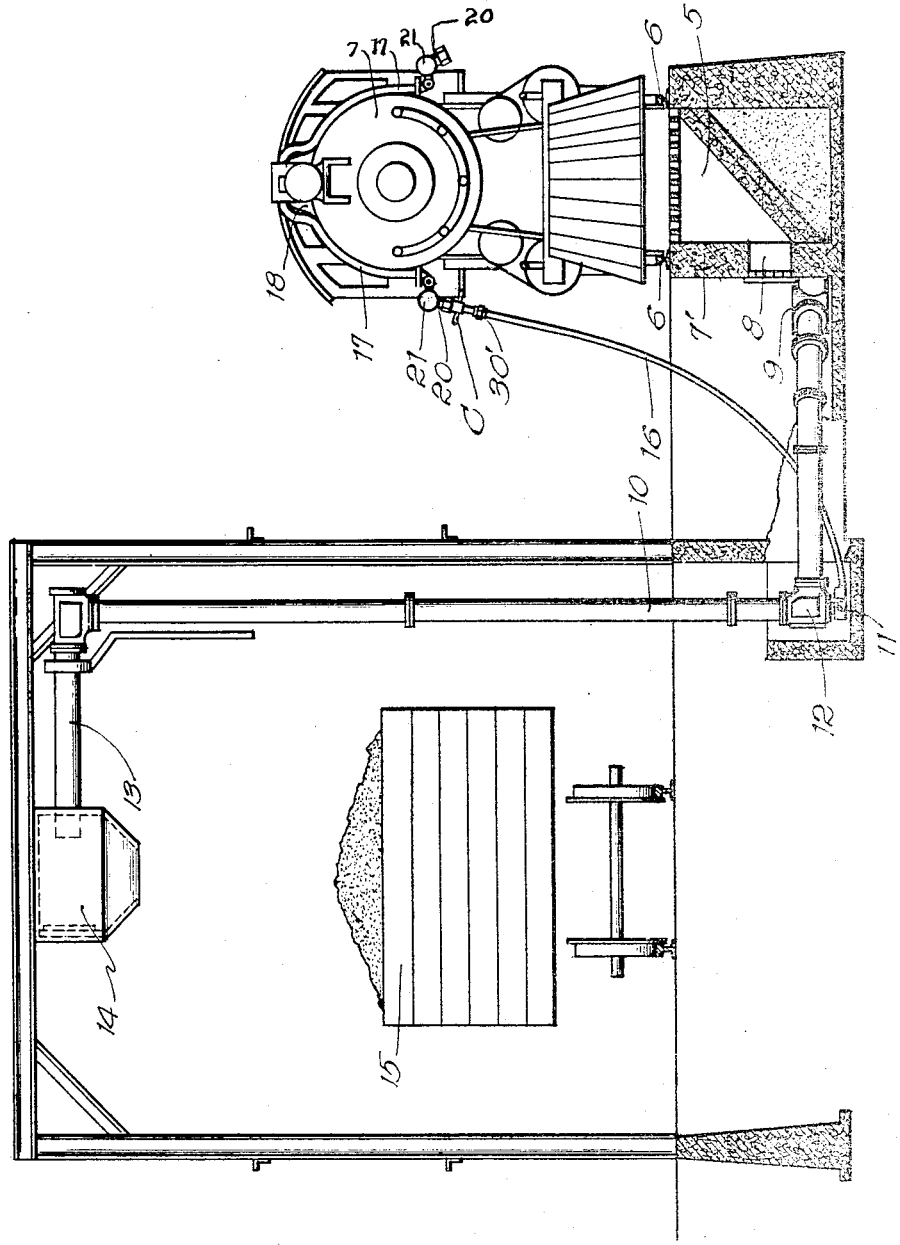

Patented Sept. 2, 1924.

1,507,015

UNITED STATES PATENT OFFICE.

CHARLES F. ZIMMERMANN, OF CHICAGO, ILLINOIS, ASSIGNOR TO AMERICAN STEAM CONVEYOR CORPORATION, OF CHICAGO, ILLINOIS, A CORPORATION OF NEW YORK.

MEANS FOR CONVEYING STEAM AND OTHER FLUIDS UNDER PRESSURE.

Application filed February 13, 1919. Serial No. 276,799.

*To all whom it may concern:*

Be it known that I, CHARLES F. ZIMMERMANN, a citizen of the United States, residing at Chicago, in the county of Cook and State of Illinois, have invented a certain new and useful Improvement in Means for Conveying Steam and Other Fluids Under Pressure, of which the following is a full, clear, concise, and exact description, reference being had to the accompanying drawings, forming a part of this specification.

My invention relates to improvements in means for conveying steam and other fluids under pressure.

The objects of my invention are:

First: to provide a conduit for conveying steam from a movable source of supply to a stationary steam-consuming device of such construction that if the movable source of steam is moved away from the stationary steam-consuming device without first disconnecting the steam-conveying device from one or the other of these devices, the conduit will separate at a predetermined point and the portion of the conduit connected with the source of steam will be automatically closed to prevent the steam from escaping therefrom and injuring the operators;

Second: to provide means of the character described, comprising a coupling formed of a pair of separable coupling members, which can be quickly and easily connected or disconnected;

Third: to provide a coupling member of the character described of such construction that the two members thereof can be separated without danger of the steam or other fluid carried by said conduit escaping between the coupling members; and Fourth: to provide a novel coupling for conduits.

Others objects will appear as this description progresses, reference being had to the accompanying drawings, in which:

Figure 1 discloses apparatus illustrating one adaptation of my invention;

Figure 2 is a longitudinal section through my improved coupling; and

Figures 3 and 4 are end views respectively of the opposite ends of my coupling member.

In the several views similar reference characters will be used to refer to similar parts.

In Figure 1, I have illustrated apparatus showing one adaptation of my invention. In this figure the reference character 5 indicates an ash pit located beneath tracks 6—6 upon which the locomotive 7 rests. The ash pit 5 is designed to receive the ashes dumped from the ash pan of the locomotive. The wall 7' of the ash pit 5 is provided with an opening 8, through which the ashes from the pit 5 can be raked into an intake T 9 of the ash conveyor conduit 10. The ashes are conveyed through this conduit by means of suction and pressure created by a steam injector nozzle 11 in the impact elbow 12. This nozzle projects a jet of steam upwardly in the riser of the conduit, thereby creating a vacuum in the lower horizontal portion of the conduit which connects the ash pit with the riser. This vacuum causes the ashes to be forced through this horizontal portion until they encounter the steam jet, which then forces them through the riser and the upper horizontal portion 13 of the ash conveyor conduit, from which they are discharged into the hopper 14, from whence they drop into the car 15.

In order to supply steam for operating this ash conveyor system, I provide a steam conduit 16, which is preferably flexible, for conveying steam from one of the pipes 17 connected with the steam header 18 of the locomotive.

The system thus far described is not my own invention, and I do not claim any invention therein, except in so far as these parts enter into the novel combination which I am about to describe and claim. There is always a possibility in systems such as that just described of the locomotive being moved away from the ash pit before the steam conduit 16 is disconnected from the locomotive. Under such circumstances, something must necessarily give way, and this would most likely be the steam conduit which connects the locomotive with the ash conveyor conduit, the injector, or the connection between this conduit and the locomotive or between this conduit and the injector. In either event, the steam escaping from the locomotive would be a potential source of danger to the operators or any other person in the immediate vicinity. It is one of the objects of my invention, as stated above to provide means to prevent injury to the operators in the event that the locomotive is moved away from the pit without first disconnecting it from the conduit supplying steam to the injector nozzle.

To accomplish this result I insert a coupling, indicated in general in Figure 1 by reference character C, which comprises two separable coupling members so connected together that they will not separate under the pressure of the steam in the conduit, but will separate if a greater tension is applied to these coupling members than that exerted by the steam, so that when the locomotive is moved away without first disconnecting the steam conduit therefrom these members will separate the conduit at a predetermined point, thereby protecting the connected parts of the locomotive and the ash conveyor system from injury. In order to prevent the escape of steam from that part of the conduit connected with the locomotive, I provide a check valve in this portion of the conduit, closing away from the locomotive, which automatically closes when the two portions of the coupling member are separated while steam is flowing therethrough.

Referring to Figures 2, 3 and 4, I shall now describe the details of my novel coupling. The reference character 20 indicates a tubular coupling member which is connected by any suitable means, preferably a ball-and-socket union 21 (see Figure 1), with the locomotive. This coupling member is provided with external screw threads 22, the pitch of these screws being comparatively steep, as shown in Figure 2. The free end of this coupling member is beveled, as shown at 23. A valve seat 24 is formed on the interior of the coupling member 20, and a valve 25 is slidably mounted in the spider 26 in the coupling member 20, to co-act with the seat 24 to close the coupling member 20.

A second coupling member 27 is rotatably mounted upon the end of a short section 28 of pipe by means of the screw-threaded connection 29. The section 28 of pipe is connected with the flexible conduit 16 by any suitable union 30', as shown in Figure 1. If desired, the short section of pipe 28 can be omitted, and the flexible conduit 16 connected directly to the coupling member 27. The conduit will possess sufficient resiliency to permit the coupling member 27 to be rotated through a sufficient angle to connect it with the coupling member 20.

The coupling member 27 is provided with internal screw threads 30, which co-act with the screw threads 22 of the coupling member 20 to secure these two members together. The coupling member 27 is likewise provided with a seat 31, which is beveled similarly to the free end of the coupling member 20, and co-acts with the beveled end of this latter member to provide a steam-tight joint between the two coupling members when these two members are connected with each other.

The free end of the coupling member 27 is beveled, as indicated at 32, and is also provided with a plurality of longitudinal slots 33, forming clamping tongues 34. A clamping sleeve 35 is rotatably and adjustably mounted upon the coupling member 20 by means of the screw-threaded connection 36, and is provided with a beveled seat 37 that engages the beveled surfaces of the spring tongues 34 to clamp these spring tongues against the coupling member 20 when the coupling member 27 is connected with the coupling member 20. Extending co-axial with and substantially to the mouth of the coupling member 27 is a rod 39, the inner end of which is supported in a bar 38. The bar 38 extends diametrically across the passageway or bore of the coupling member 27. In normal operation the member 20 lies within the open end of the member 27, as shown in Figure 2, the member 27 being disposed inside of the clamping sleeve 35. The coupling member 27 is provided with a pair of oppositely extending handles 40, by means of which it can be easily and quickly rotated.

To connect the conduit 16 with the locomotive, the coupling member 27 is brought into position, so that its free end registers with the free end of the coupling member 20, and the coupling member 27 is rotated by means of the handles 40, so as to cause the coupling member 27 to be threaded onto the coupling member 20. The threads 22 and 30 are of such pitch that it requires but a fractional part of a revolution of the coupling member 27—preferably one-third or one-half of a revolution—to bring these two members into such position relative to each other that the beveled portion 23 of the coupling member 20 co-acts with the beveled seat of the coupling member 27 to form a steam-tight union. Before, however, the coupling member 27 is completely threaded upon the coupling member 20, the outer end of the rod 39 will engage the valve 25, which is held upon its seat by the steam pressure of the boiler, and lift this valve from its seat, so that when the two members are completely joined, the valve 25 will have been lifted from its seat to the position shown in Figure 2, thereby permitting steam to flow from the boiler through both coupling members and the conduit 16.

It will of course be clear that the valve 25 is lifted from its seat before the beveled portion 23 of the coupling member 20 is brought into co-acting relation with the beveled seat of the coupling member 27, and that there will consequently be a tendency for the steam to escape between the two coupling members. To do this, however, the steam must find its way between the screw threads of these two members. The first steam to pass between these threads will be condensed, and the water produced by this condensation will act as a sort of water-seal to prevent any further leakage of steam therethrough. Besides, it will require but a fraction of a second to completely connect the two coupling members, so that the amount of steam which will escape between the threads of these members will be so small as to not in any way interfere with the connection of these two members.

As stated above, the threads of the two coupling members have a steep pitch. It might happen that the pressure of the steam flowing through these coupling members when they are connected would be sufficient to cause the coupling members to rotate relative to each other and thereby become disconnected. I prevent any such mishap by means of the sleeve 35, which clamps the tongues 33 against the coupling member 20, or the threads thereof, thereby producing a frictional contact between these tongues, the coupling member 20, and the sleeve 35, which is sufficient to prevent rotation of the coupling members relative to each other by reason of the pressure of the steam flowing therethrough. The sleeve 35 is screw-threaded to the coupling member 20 so as to permit of its proper adjustment relative to the coupling member, and to provide means to compensate for wear.

If for any reason the locomotive 7 should be moved from the ash pit before the two coupling members are disconnected from each other by the operator, tension will be placed upon the conduit 16. This tension will produce a force tending to rotate the coupling member 27 upon the coupling 20 in such a manner as to disengage these two coupling members from each other. During the initial separating movement of the two coupling members, the valve 25 will, under the pressure of the steam flowing through the coupling member, be caused to seat upon the valve seat 24, thereby closing the coupling member 20 before the two coupling members are entirely disengaged from each other. It will therefore be seen that when the two coupling members are entirely disengaged, the valve 25 will be closed, and steam will be prevented from issuing from the coupling member 20.

In the above description I have referred to a ball-and-socket union 21 for securing the coupling member 20 to the pipe 17. I have also set forth that the conduit 16 is flexible. One of the reasons for providing this ball-and-socket union and the flexible conduit is to provide flexible means between the locomotive and the coupling and between the coupling and the steam-consuming device which will permit the force exerted upon the coupling to be exerted in a line parallel with the axis of the coupling. Otherwise, if either the conduit 16 or the connection between the pipe 17 and the coupling C were rigid, the strain imposed upon the coupling would be at an angle to its axis, and would require much greater force to separate the two coupling members.

It will of course be clear that where the force imposed upon the steam conduit is substantially parallel with the axis of the coupling or the conduit, it will be unnecessary to make the conduit flexible or to provide a ball-and-socket or other equivalent structure on the opposite side of the coupling.

While I have described the details of the preferred embodiment of my invention, it is to be understood that my invention is not to be limited to these details, but is capable of being used in other relations than that illustrated and described in this application and is also capable of other modifications within the scope of the appended claims.

Having thus described my invention, what I claim is:—

1. Means for conveying steam from the boiler of a locomotive to a steam-consuming device, comprising a conduit having one end adapted to be connected with the locomotive boiler, a second conduit having one end adapted to be connected to said steam-consuming device, a tubular coupling member secured to the other end of said first-named conduit, the said coupling member having an external screw thread of steep pitch and having its free end beveled, a valve seat formed in said coupling member, a valve movably mounted in said coupling member for co-acting with said valve seat, a second tubular coupling member rotatably mounted on the other end of said second-named conduit, and having internal screw threads for co-acting with the screw threads of said first-named coupling member, and a beveled seat to receive the beveled end of said first-named coupling member, the free end of said second coupling member being beveled and longitudinally slotted to form a plurality of clamping tongues, means for rotating said second coupling member, means secured to said second coupling member for opening said valve when said coupling members are brought into co-acting relation, and a sleeve secured to said first-named coupling member and provided with a beveled seat for clamping said clamping tongues to said first-named coupling member.

2. Means for conveying steam from the boiler of a locomotive to a steam-consuming device, comprising a conduit having one end adapted to be connected with the locomotive boiler, a second conduit having one end adapted to be connected to the steam-consuming device, a tubular coupling member secured to the other end of said first-named conduit, the said coupling member having an external screw thread and having its free end beveled, a valve seat formed in said coupling member, a valve movably mounted in said coupling member for co-acting with said valve seat, a second tubular coupling member rotatably mounted on the other end of said second-named conduit, and having internal screw threads for co-acting with the screw threads of said first-named coupling member, and a beveled seat to receive the beveled end of said first-named coupling member, means for rotating said second coupling member, means secured to said second coupling member for opening said valve when said coupling members are brought into co-acting relation, and means for yieldingly securing said coupling members against rotation relative to each other.

3. Means for conveying steam from the boiler of a locomotive to a steam-consuming device, comprising a conduit having one end adapted to be connected with the locomotive boiler, a coupling member secured to the other end of said conduit and provided with an external screw thread and a valve, a second conduit having one end adapted to be connected to said steam-consuming device, a tubular coupling member secured to the other end of said second-named conduit, the said coupling member having an internal screw thread, means for rotating said second coupling member, means secured to said second coupling member for opening said valve when said coupling members are brought into co-acting relation, and means for yieldingly securing said coupling members against rotation relative to each other.

4. Means for conveying steam from the boiler of a locomotive to a steam-consuming device, comprising a conduit having one end adapted to be connected with a locomotive boiler, a second conduit having one end adapted to be secured to the steam-consuming device, a coupling member secured to the free end of said first-named conduit, a second coupling member secured to the free end of said second conduit, the said coupling members being provided with co-acting means for yieldingly holding said coupling members together, comprising means for preventing said coupling members from becoming uncoupled by the pressure of the steam in said coupling members, a valve in said first-named coupling member, and means on said second coupling member for holding said valve open when said coupling members are secured together, said valve being subjected to the pressure of the steam flowing in said first-named conduit, so as to automatically close when said coupling members are separated while steam is flowing therethrough.

5. Means for conveying steam from a movable source of steam to a steam consuming device, comprising a coupling having separable portions, interlocking means carried by said portions for nonpositively holding said separable portions against separation by the pressure of the steam flowing therethrough, an automatically closing check valve in one of said portions, and means for holding said check valve open when said coupling members are secured together.

6. A tubular conveying coupling comprising a pair of coupling members having steep-pitched threaded connection with each other and frictional means secured to one of said coupling members for frictionally engaging the other of said coupling members to prevent separation of the coupling members.

7. A coupling comprising a pair of tubular coupling members having steep pitched threaded connection with each other, and means adjustably secured to one of said coupling members and frictionally engaging the other coupling member for yieldingly holding said coupling members together against separation.

8. Means for conveying steam from a movable source of steam supply to a stationary steam-consuming device comprising conduits connected to said steam source and consuming device, and members on said conduits forming a coupling therefor, said members comprising means whereby excessive longitudinal tension on said conduits causes relative rotation of said members to uncouple said conduits.

In witness whereof, I hereunto subscribe my name this 10th day of February, 1919.

CHARLES F. ZIMMERMANN.

Witnesses:
P. D. KENDALL,
J. MAGEE.